United States Patent [19]
Goff et al.

[11] 3,946,176
[45] Mar. 23, 1976

[54] DIFFERENTIAL PRESSURE SWITCH

[75] Inventors: Randall Goff, Weston; Leonard P. Delvecchio, Trumbull, both of Conn.

[73] Assignee: Dresser Industries, Inc., Dallas, Tex.

[22] Filed: Dec. 4, 1974

[21] Appl. No.: 529,866

[52] U.S. Cl. ............... 200/83 J; 200/83 Y; 92/38; 73/407 R
[51] Int. Cl.² ................... H01H 35/34; H01H 35/38
[58] Field of Search ....... 116/70, 114 P; 200/153 T, 200/83 A, 83 J, 83 Y, 83 Q, 83 W; 73/263, 264, 407 R, 407 PR; 74/89.15; 92/37, 38, 101, 130; 137/111, 118

[56] References Cited
UNITED STATES PATENTS

| | | | |
|---|---|---|---|
| 2,173,082 | 9/1939 | Kalischer | 200/83 Q |
| 2,253,365 | 8/1941 | Dawson | 200/83 Q |
| 2,735,369 | 2/1956 | Turvey | 92/38 |
| 2,917,081 | 12/1959 | Nolte | 92/38 |
| 3,034,357 | 5/1962 | Brown | 73/407 R |
| 3,240,065 | 3/1966 | Taber | 73/407 R |
| 3,393,612 | 7/1968 | Gorgens | 200/83 J |
| 3,859,484 | 1/1975 | Nelson | 200/83 Y |

Primary Examiner—Gerald P. Tolin
Attorney, Agent, or Firm—Daniel Rubin

[57] ABSTRACT

A differential pressure module is secured in switching relation to the actuating plunger of an electrical switching mechanism. Comprising the differential pressure module are two piston/cylinder assemblies connected together in back-to-back configuration by secured cross members forming a floating yoke. Each of the assemblies includes a diaphragm in communication with a separate oppositely directed fluid inlet and through which a force differential effective from the separate forces acting in opposition to each other is applied via the yoke against the switch actuator. A cast body intervening between the assemblies defines the fluid inlets while maintaining the pressure of each isolated from the other.

9 Claims, 8 Drawing Figures

DIFFERENTIAL PRESSURE SWITCH

BACKGROUND OF THE INVENTION

1. The field of art to which the invention pertains includes the art of electrical switching actuated by a pressure input.

2. Electrical switches adapted to operate in response to fluid pressures are widely used for an endless variety of industrial applications. Exemplifying pressure switches of the type commercially available is the disclosure of Gorgens et al U.S. Pat. No. 3,393,612 in which the switching mechanism is responsive to a single source pressure input. Likewise used widely are electrical switches operatively responsive to a pressure differential as might be used to operate a control function in correlation to a difference in pressure between taps such as, for example, those existing on either side of an orifice plate for measuring pressure drop across the plate.

In its simplest form, differential pressure switches of the prior art frequently employ a flexible diaphragm unit of sorts separating the opposing fluids as disclosed, for example, in U.S. Pat. No. 3,566,060. The respective pressures of each fluid are thereby permitted to bias the diaphragm in one direction or the other as a function of their net pressure differential. Sufficient movement of the diaphragm in either direction then operates via an actuating mechanism to effect appropriate triggering of an electrical switch mechanism with which it is associated. While operatively effective and appearing sound in principle, a significant drawback of such constructions is the potential mixing of pressures in the event of diaphragm failure. Still other differential pressure switch constructions are available which avoid the potential problem of fluid mixing through diaphragm failure by utilizing more costly features enabling the opposing fluids to be isolated by an intervening structure of substance. Exemplifying the latter are the disclosures of U.S. Pat. Nos. 3,626,813 and 3,751,988.

SUMMARY OF THE INVENTION

The invention relates to a differential pressure switch and more particularly to such a switch of relatively compact, uncostly construction for providing the safety of fluid isolation even in the event of diaphragm failure. This is achieved in accordance herewith by use of a differential module mounted in operative relation with the actuator of a switch mechanism. The module, in turn, is formed of two piston/cylinder assemblies each exposed to an oppositely directed fluid of different pressure through a flexible diaphragm. Secured cross members forming a floating yoke connect the assemblies embraced together in back-to-back configuration. Supported intervening between the piston/cylinders is a capsule-like cast body having displaced inlets for receiving and directing the fluids of differing pressure. One of the fluid inlets directs received fluid pressure from an underside outlet in the body toward one of the piston/cylinders and the other directs received fluid pressure from a topside outlet in the body toward the other of the piston/cylinders. In this manner, the piston/cylinder assemblies are maintained pressure isolated from each other as to preclude pressure mixing therebetween while at the same time affording a compact and relatively uncostly assembly operably acting against the switch actuator via the differential force exerted by the yoke.

It is, therefore, an object of the invention to provide a differential pressure switch of novel construction.

It is a further object of the invention to provide a differential pressure switch affording pressure isolation between the respective fluid supplies by means of a relatively compact construction minimizing space requirements therefor.

It is a still further object of the invention to achieve the foregoing objects with a relatively uncostly construction as compared to similar purpose devices of the prior art.

BRIEF DESCRIPTION OF THE DRAWINGS

Referring now to FIGS. 1–6, the pressure differential switch in accordance herewith is comprised of a pressure operable switching mechanism 10 and a differential pressure module 12 secured together along a joint line 14.

Figure 1:
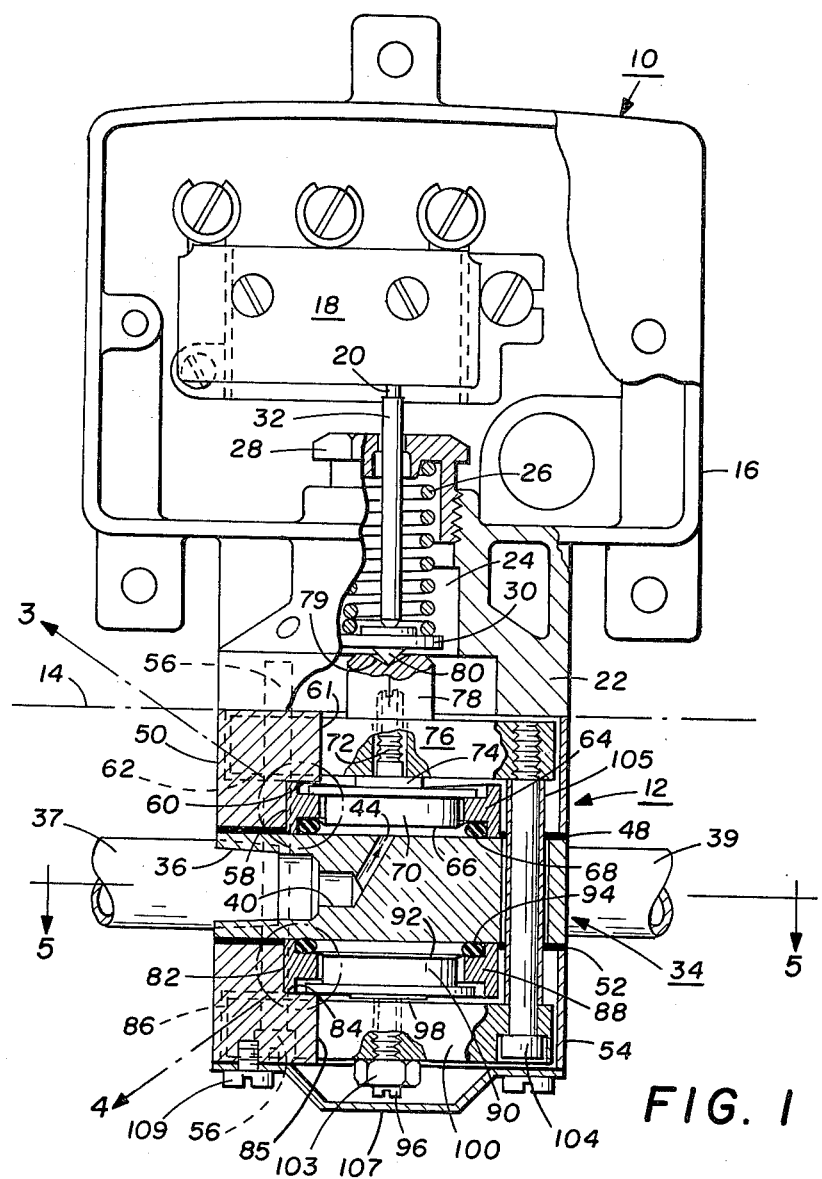
FIG. 1 is an elevation view of a switch and module construction in accordance herewith partially sectioned substantially along the lines 1—1 of FIG. 5.
Figure 2:
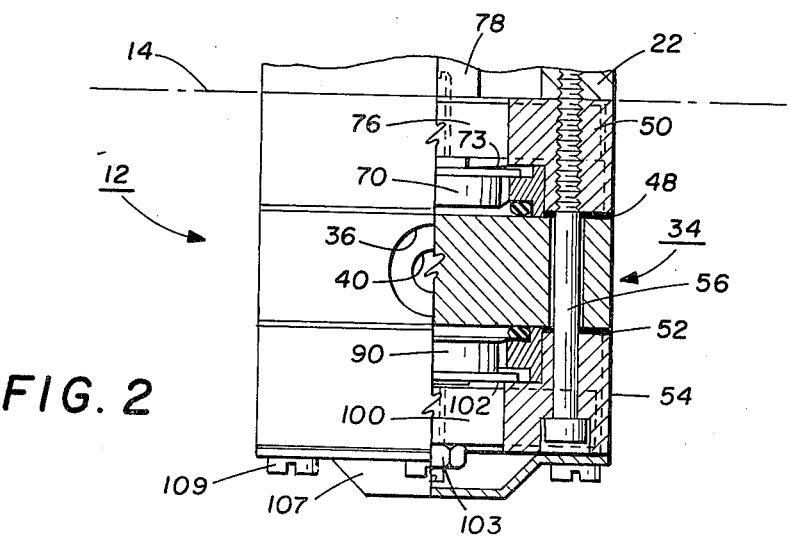
FIG. 2 is an elevation view half-sectioned of the pressure module of FIG. 1 as viewed substantially 90° displaced therefrom.
Figure 3:
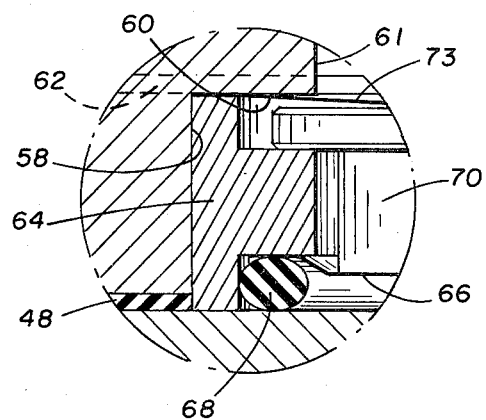
FIGS. 3 and 4 are fragmentary enlargements of the respective encircled portions of FIG. 1.
Figure 4:
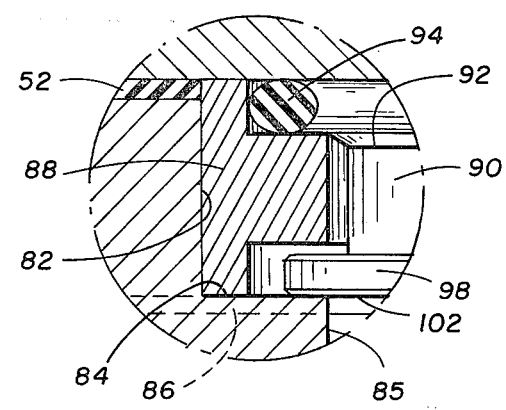
Figure 5:
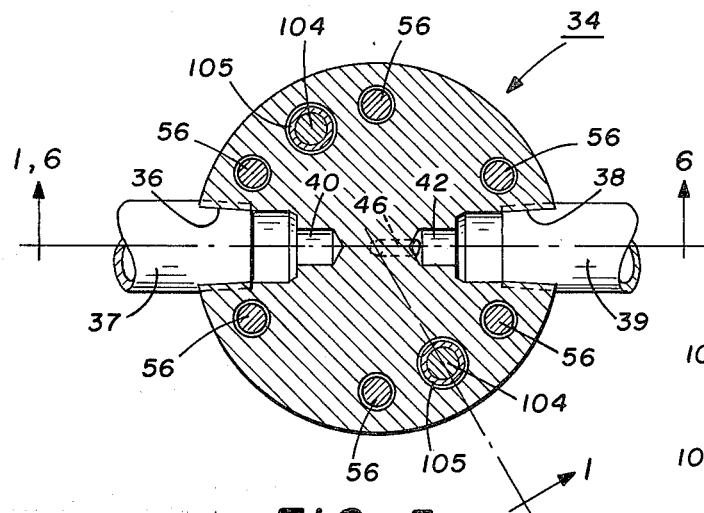
FIG. 5 is a sectional view taken substantially along the lines 5—5 of FIG. 1.

Switching mechanism 10 may, for example, be comprised of a type disclosed in Gorgens et al patent, supra, in which a cast box-like housing 16 includes an electrical switch 18 operably actuated by a vertically dependent actuator plunger 20. On the underside of housing 16 is an integrally cast neck 22 terminating at joint line 14 and having a central bore defining a through passage 24. Within the passage is contained a coiled range spring 26 compressed between an adjustable cap 28 and a disc 30 tending to displace push rod 32 away from plunger 20. The preload of the spring determines the operating set point of the switch.

Figure 6:
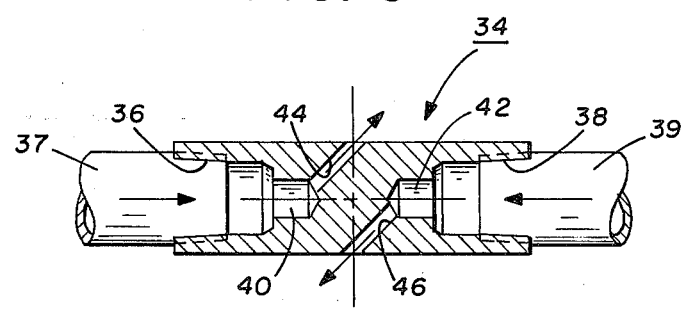
FIG. 6 is a sectional view taken substantially along the lines 6—6 of FIG. 5.

For operating switch 10 in accordance herewith, there is provided a differential pressure module 12 as will now be described. Comprising module 12 at the axially central portion thereof is an annular capsule-like body 34 intervening between a top spacer 50 and a bottom spacer 54 secured together by bolts 56. Body 34 is of machined finish having fluid inlets 36 and 38 180° displaced and providing connections for piping 37 and 39 supplying fluid thereto from appropriate sources. For reasons as will be understood, inlet 36 is adapted to receive fluid of the higher pressure being supplied. Forming an outlet for inlets 36 and 38 to discharge fluid received thereat are reduced diameter end bores 40 and 42, respectively. The end bores, in turn, communicate with obliquely angled passages 44 and 46, which extend to a central port opening in the upper and lower end faces of body 34. (FIG. 6)

Top spacer 50 is supported superposed over body 34 via an intermediate gaskeet 48 and extends to a juxtaposed position at joint line 14 for matchup with the underside of switch housing neck 22. Formed in the top spacer at its underside is a central bore 58 terminating inward at a radial shoulder 60 in turn merging centrally with a bore 61 and transverse slot 62. Close fitting within bore 58 is a ring-like cylinder 64 of substantially T-shaped wall section compressing at its underside an annular O-ring gasket 68. Secured in turn by gasket 68 is a flexible diaphragm 66 exposed to the port opening of body passage 44 for responding to the level of fluid pressure supplied thereat. Centrally supported inward of the cylinder is a T-shaped piston 70 engaged at its underside by diaphragm 66 while its topside is contained in the annular pocket beneath spacer shoulder 60. A stud 72 projects centrally upward therefrom beyond the top face of the spacer for supporting a nut 78 while an annular spider spring 73 functions to maintain piston alignment. Overlying piston 70 and a washer 74 on stud 72 is an inflexible beam 76 generally supported unsecured and loose in transverse spacer slot 62 but secured in place to piston 70 by nut 78. The nut is conically cupped inward at 79 to accommodate and be engaged by cone 80 on the underside of disc 30.

Bottom spacer 54 is similarly supported subtending body 34 and separated therefrom by an intermediate gasket 52. The bottom spacer 54 is essentially similar but arranged generally opposite-hand to top spacer 50 and likewise includes a central bore 82 extending inward to a radial shoulder 84 which, in turn, merges centrally with a bore 85 and transverse slot 86. Contained in bore 82 in the pocket above shoulder 84 is a ring-like cylinder 88 similar to cylinder 64 above to support a T-shaped piston 90 inverted but similar to piston 70. Secured about its edges overlying the topside of the piston via an annular compressed O-ring gasket 94 is a flexible diaphragm 92 exposed to the opening of body port 46 for responding to the level of fluid pressure supplied thereat. A stud 96 supporting a Bellville washer 98 depends from the underside of the piston at which transverse beam 100 contained unsecured and loose in transverse slot 86 is supported by a nut 103. An annular spider spring 102 similarly functions to maintain piston alignment.

Figure 7:
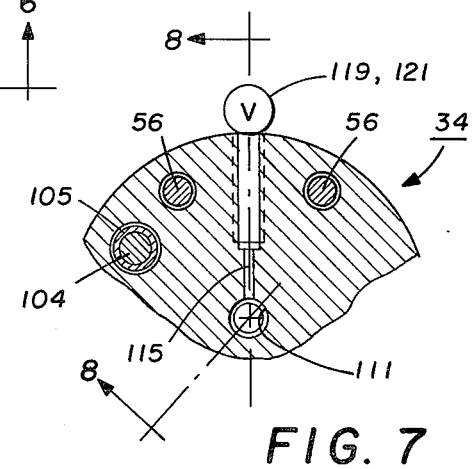
FIG. 7 is a fragmentary view similar to FIG. 5 for an alternative embodiment.
Figure 8:
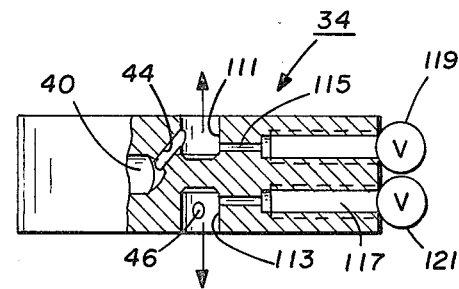
FIG. 8 is a sectional elevation similar to FIG. 6 for the alternative embodiment of FIG. 7.

By means of a pair of vertical bolts 104 extending loosely through a body sleeve 105, transverse beams 100 and 76 are joined to form a rigid yoke embracing the piston/cylinder assemblies and able to float with the assemblies as a unit in slots 62 and 86. The yoke in this arrangement is responsive to the differential in pressure exposed to the diaphragms for transmitting via its floating action a correlated net differential force against disc 30 in opposition to spring 26. A total yoke travel of about 0.015 inches is permitted in the spacing defined between radial shoulders 60 and 84. In the event of excessively high pressure being applied to either one or the other of the pistons, the diaphragms are protected against overpressure by the built in stops afforded by the shoulders. A cap 107 secured via a plurality of screws 109 encloses the underside of the module.

Where bleed connections are required, body 34 may alternatively be constructed as illustrated in FIGS. 7 and 8 in which oblique passages 44 and 46 communicate with vertical bores 111 and 113 exposed to diaphragms 66 and 92, respectively. Further connecting with the latter bores are bore passages 115 and 117 which can be operably opened and closed via valves 119 and 121.

In operation, fluid of the higher pressure is supplied via pipe 37 to inlet 36 and fluid of the lower pressure is supplied via pipe 39 to inlet 38. Fluid of the former is in turn exposed against the underface of diaphragm 66 to urge piston 70 and beam 76 upward against disc 30 in opposition to the downward force being imposed by range spring 26. Simultaneously therewith, fluid pressure at inlet 38 acts downwardly against diaphragm 92, piston 90 and beam 100 concurrently aiding the imposed force of spring 26. By virtue of the yoke flotation afforded beams 76 and 100 as a unit, only the net difference in fluid pressure imposed by the respective fluids against the opposed pistons is transmitted by the yoke to nut 78 in opposition to the force of range spring 26. Since the effective areas of the two pistons are equal, the net force developed by the yoke against the range spring is equal only to the difference between the two applied pressures multiplied by the effective piston area. If high static pressure is supplied equally to both pistons, the resulting forces are confined within the yoke. Because of the separation and isolation afforded the pressure elements by intervening body 34, failure of either diaphragm cannot cause mixing of the pressure fluids thereby enhancing safety of the unit.

By the above description there is disclosed a novel differential pressure switch of compact design affording the virtues of pressure isolation in the event of diaphragm failure in one or other of the pressure responsive assemblies. By virtue of the overload protection, the device incorporates high overpressure capability. Since all the wetted surfaces are contained in body 34, only that portion of the module need be of relatively expensive corrosion-resistant material as to permit the use of aluminum or other less expensive material for the remaining components.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privelege is claimed are defined as follows:

1. A pressure switch including an electrical switching mechanism, a pressure movable actuator for operating said switching mechanism between on-off positions, a range spring operatively effective to oppose pressure induced movement of said actuator, and a differential pressure unit comprising in combination:
    a. body means having a pair of separated fluid inlets in which to receive pressurized fluid from different sources, a first of said inlets communicating with a first fluid outlet opening in said body means and a second of said inlets communicating with a second fluid outlet opening in said body means;
    b. a pair of spaced apart diaphragm-piston assemblies supported with said body means intervening therebetween, one of said assemblies being exposed in pressure-tight relation to the first of said fluid outlet openings and the second of said assemblies being exposed in pressure-tight relation to the second of said fluid outlet openings; and
    c. a unitary force transmitting means concomitantly engaged by each of said diaphragm-piston assemblies for operably transmitting a pressure induced force against said actuator in opposition to said range spring correlated to the difference in pressures exerted against said assemblies by the different fluid pressures received at said inlets.

2. A pressure switch according to claim 1 in which said outlet openings are located on opposite surfaces of said body means and said pistons are supported in back-to-back relation to each other.

3. A pressure switch according to claim 2 including bleed connections communicating with each of said outlet openings to exterior of said body means and valve means for opening and closing said bleed connections.

4. A pressure switch according to claim 2 in which said force transmitting means comprises a floating yoke embracing the pressure responsive movement of said assemblies.

5. A pressure switch according to claim 4 in which the higher pressure of the fluids received at said inlets is exposed to a diaphragm-piston assembly operationally opposing the force of said range spring and the lower pressure of the fluids received at said inlets is exposed to a diaphragm piston assembly operationally aiding the force of said range spring.

6. A pressure switch according to claim 5 in which said body means includes a rigid mass of body composition effectively isolating the received fluids from each other.

7. A pressure switch according to claim 6 including means defining an overload stop associated with each of said assemblies effective against a fluid overpressure received at either of said inlets.

8. A pressure switch according to claim 6 including a pair of spacers housing said assemblies, one of said spacers being supported juxtaposed to one outlet surface of said body means and the other spacer being supported juxtaposed to the other outlet surface of said body means.

9. A pressure switch according to claim 8 in which said spacers and said body means are assembled as a module for detachable mounting on said switching mechanism.

* * * * *